(12) United States Patent
He et al.

(10) Patent No.: US 7,190,152 B2
(45) Date of Patent: Mar. 13, 2007

(54) CLOSED-LOOP DIGITAL CONTROL SYSTEM FOR A DC/DC CONVERTER

(75) Inventors: Runsheng He, Sunnyvale, CA (US); Zhipei Chi, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 304 days.

(21) Appl. No.: 10/890,491

(22) Filed: Jul. 13, 2004

(65) Prior Publication Data

US 2006/0013023 A1    Jan. 19, 2006

(51) Int. Cl.
*G05F 1/40* (2006.01)
(52) U.S. Cl. ..................................... 323/282
(58) Field of Classification Search ................. 363/15, 363/16, 17; 323/282, 287, 351
See application file for complete search history.

(56) References Cited

U.S. PATENT DOCUMENTS

| | | | |
|---|---|---|---|
| 5,204,809 A | | 4/1993 | Andresen |
| 5,276,603 A | | 1/1994 | Stanley |
| 5,610,807 A | | 3/1997 | Kanda et al. |
| 5,875,103 A | * | 2/1999 | Bhagwat et al. ............... 363/17 |
| 6,144,565 A | * | 11/2000 | Lethellier ..................... 363/16 |
| 6,294,882 B1 | * | 9/2001 | Blom .......................... 315/246 |
| 6,362,986 B1 | | 3/2002 | Schultz et al. |
| 6,430,066 B2 | | 8/2002 | Emori et al. |
| 6,462,962 B1 | | 10/2002 | Cuk |
| 6,538,905 B2 | * | 3/2003 | Greenfeld et al. ............ 363/17 |

OTHER PUBLICATIONS

U.S. Appl. No. 10/621,058, filed Jul. 15, 2003, entitled, "Low Loss DC/DC Converter".
U.S. Appl. No. 10/693,787, filed Oct. 24, 2003, entitled, "Voltage Regulator".
U.S. Appl. No. 10/754,187, filed Jan. 8, 2004, entitled, "Digital Low Dropout Regulator".
U.S. Appl. No. 10/810,452, filed Mar. 26, 2004, entitled, "Voltage Regulator".

* cited by examiner

*Primary Examiner*—Adolf Berhane

(57) ABSTRACT

A closed-loop control system for a DC/DC converter includes a DC/DC converter that receives a first DC voltage and that generates a second DC voltage. The DC/DC converter includes first and second inductances. A control module receives the second DC voltage and generates at least one control signal to one of charge or discharge the first and second inductances. The control module has first and second modes. During the first mode the control module alternately charges one of the first and second inductances and discharges the other of the first and second inductances. During the second mode the control module one of charges or discharges both of the first and second inductances. The control module initiates the second mode when a transient condition occurs in the DC/DC converter. The transient condition is based on one of the second DC voltage and current through an output capacitance in the DC/DC converter.

69 Claims, 7 Drawing Sheets

US 7,190,152 B2

CLOSED-LOOP DIGITAL CONTROL SYSTEM FOR A DC/DC CONVERTER

CROSS-REFERENCE TO RELATED APPLICATIONS

This application relates to U.S. patent application Ser. No. 10/621,058, filed on Jul. 15, 2003, entitled "Low Loss DC/DC Converter", U.S. patent application Ser. No. 10/754,187, filed on Jan. 8, 2004, entitled "Digital Low Dropout Regulator", which is a continuation-in-part of U.S. patent application Ser. No. 10/693,787, filed on Oct. 24, 2003, and U.S. patent application Ser. No. 10/810,452, filed on Mar. 26, 2004, entitled "Voltage Regulator". The disclosures of the above applications are all hereby incorporated by reference in their entireties.

FIELD OF THE INVENTION

The present invention relates to DC/DC converters, and more particularly to digital control systems for DC/DC converters.

BACKGROUND OF THE INVENTION

DC/DC converters are electronic devices that employ inversion and/or rectification to transform DC voltage at a first level into DC voltage at a second level. For example, a DC/DC converter may step-up DC voltage, step-down DC voltage, or may be capable of both stepping up and stepping down DC voltage. DC/DC converters typically include one or more inductors. Inductors are circuit elements that operate based on magnetic fields. The source of the magnetic field is charge that is in motion, or current. If current varies with time, the magnetic field that is induced also varies with time. A time-varying magnetic field induces a voltage in conductors that are linked by the magnetic field.

Referring to FIG. 1A, a DC/DC converter 10 includes an inductor 12. Inductors 12 in DC/DC converters 10 typically communicate with at least one switch and at least one capacitor. For example, the switch may be a transistor and the capacitor may be an output capacitor that filters an output voltage of the DC/DC converter 10. A control module may communicate with the switch to control when the inductor 12 charges or discharges. For example, when the switch is on, the input current may flow through the switch and inductor 12 to the capacitor while building up the magnetic field of the inductor 12. When the switch is off, the inductor 12 opposes the drop in current and supplies current to the capacitor.

Referring now to FIGS. 1B and 1C, one or more conductors form coupled inductor circuits 14 and 16, respectively. In FIG. 1B, first and second conductors pass through the same magnetic core and exhibit mutual coupling with a coupling coefficient that is approximately equal to 1. In FIG. 1C, a single conductor passes through the magnetic core two or more times and exhibits mutual coupling with a coupling coefficient that is approximately equal to 1. Those skilled in the art can appreciate that still other inductor circuits may be employed. In FIGS. 1B and 1C, the coupled inductor circuits 14 and 16 are implemented in DC/DC converters 18 and 20, respectively. DC/DC converters 18 and 20 that employ coupled inductor circuits 14 and 16 have a fast response with small voltage ripple and high efficiency.

Control modules in DC/DC converters generate control signals to turn the switches on an off and to adjust a rate at which the inductors charge and discharge. The control signals typically have fixed frequencies and duty cycles to obtain predetermined output voltages. However, when the control module maintains control signals at a fixed frequency and duty cycle, the control module is unable to adapt to changing circuit conditions.

SUMMARY OF THE INVENTION

A closed-loop control system for a DC/DC converter according to the present invention includes a DC/DC converter that receives a first DC voltage and that generates a second DC voltage. The DC/DC converter includes first and second inductances. A control module communicates with the DC/DC converter, receives the second DC voltage, and generates at least one control signal to one of charge or discharge the first and second inductances. The control module has first and second modes. During the first mode the control module alternately charges one of the first and second inductances and discharges the other of the first and second inductances. During the second mode the control module one of charges or discharges both of the first and second inductances.

In other features, the control module initiates the second mode when a transient condition occurs in the DC/DC converter. The control module detects the transient condition when the second DC voltage is one of greater than a first predetermined voltage or less than a second predetermined voltage. During the second mode the control module initiates the first mode when the second DC voltage is both less than the first predetermined voltage and greater than the second predetermined voltage. The control module discharges both of the first and second inductances when the second voltage is greater than the first predetermined voltage. The control module charges both of the first and second inductances when the second DC voltage is less than the second predetermined voltage.

In still other features of the invention, the DC/DC converter includes an output capacitance. The control module detects the transient condition when current through the output capacitance is one of greater than a first predetermined current or less than a second predetermined current. During the second mode the control module initiates the first mode when the current is less than the first predetermined current and greater than the second predetermined current. The control module charges both of the first and second inductances when the current is less than the second predetermined current. The control module discharges both of the first and second inductances when the current is greater than the first predetermined current. The control module determines the current based on a rate of change of the second DC voltage. The current is one of greater than the first predetermined current or less than the second predetermined current when the rate of change is greater than a predetermined rate of change. The control module determines the current based on an average value of the second DC voltage during a predetermined time period.

In yet other features, during the second mode the control module initiates the first mode after a predetermined time period. The DC/DC converter includes an output capacitance. The output capacitance discharges when the control module discharges both of the first and second inductances. The DC/DC converter includes an output capacitance. The output capacitance charges when the control module charges both of the first and second inductances.

In still other features of the invention, the DC/DC converter includes first, second, third, and fourth switches. Second terminals of the first and third switches communicate with first terminals of the second and fourth switches, respectively. First terminals of the first and third switches communicate. Second terminals of the second and fourth switches communicate. A first end of the first inductance communicates with the second terminal of the third switch and the first terminal of the fourth switch. A first end of the second inductance communicates with the second terminal of the first switch and the first terminal of the second switch. Second ends of the first and second inductances communicate. A capacitance has a first end that communicates with the second ends of the first and second inductances and a second end that communicates with the second terminals of the second and fourth switches.

In yet other features, the first, second, third, and fourth switches comprise transistors. The control module generates first, second, third, and fourth control signals that communicate with control terminals of the first, second, third, and fourth switches, respectively. The control module asserts the third and fourth control signals to charge the first inductance and the first and second control signals to charge the second inductance. The first DC voltage is input to the first terminals of the first and third switches. The second DC voltage is referenced from the first end of the capacitance. The DC/DC converter includes a current source. A first end of the current source communicates with the second end of the first and second inductances and the first end of the capacitance and a second end of the current source communicates with the second terminals of the second and fourth switches and the second end of the capacitance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1B:
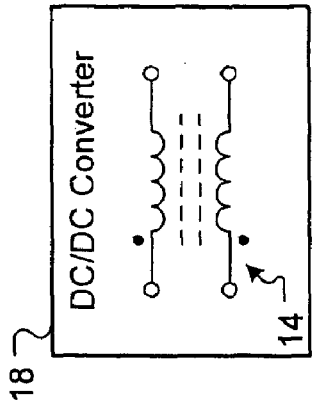
FIG. 1B is a functional block diagram and electrical schematic of a coupled inductor circuit with two conductors implemented in an exemplary DC/DC converter according to the prior art.
Figure 1C:
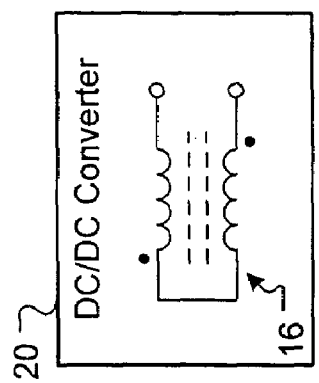
FIG. 1C is a functional block diagram and electrical schematic of a coupled inductor circuit with one conductor implemented in an exemplary DC/DC converter according to the prior art.
Figure 1A:
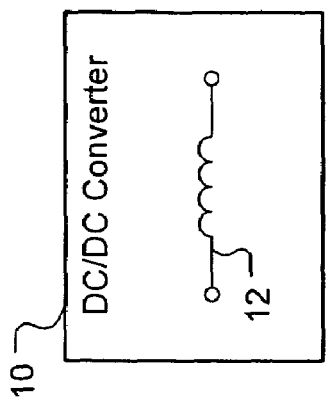
FIG. 1A is a functional block diagram and electrical schematic of an inductor implemented in an exemplary DC/DC converter according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
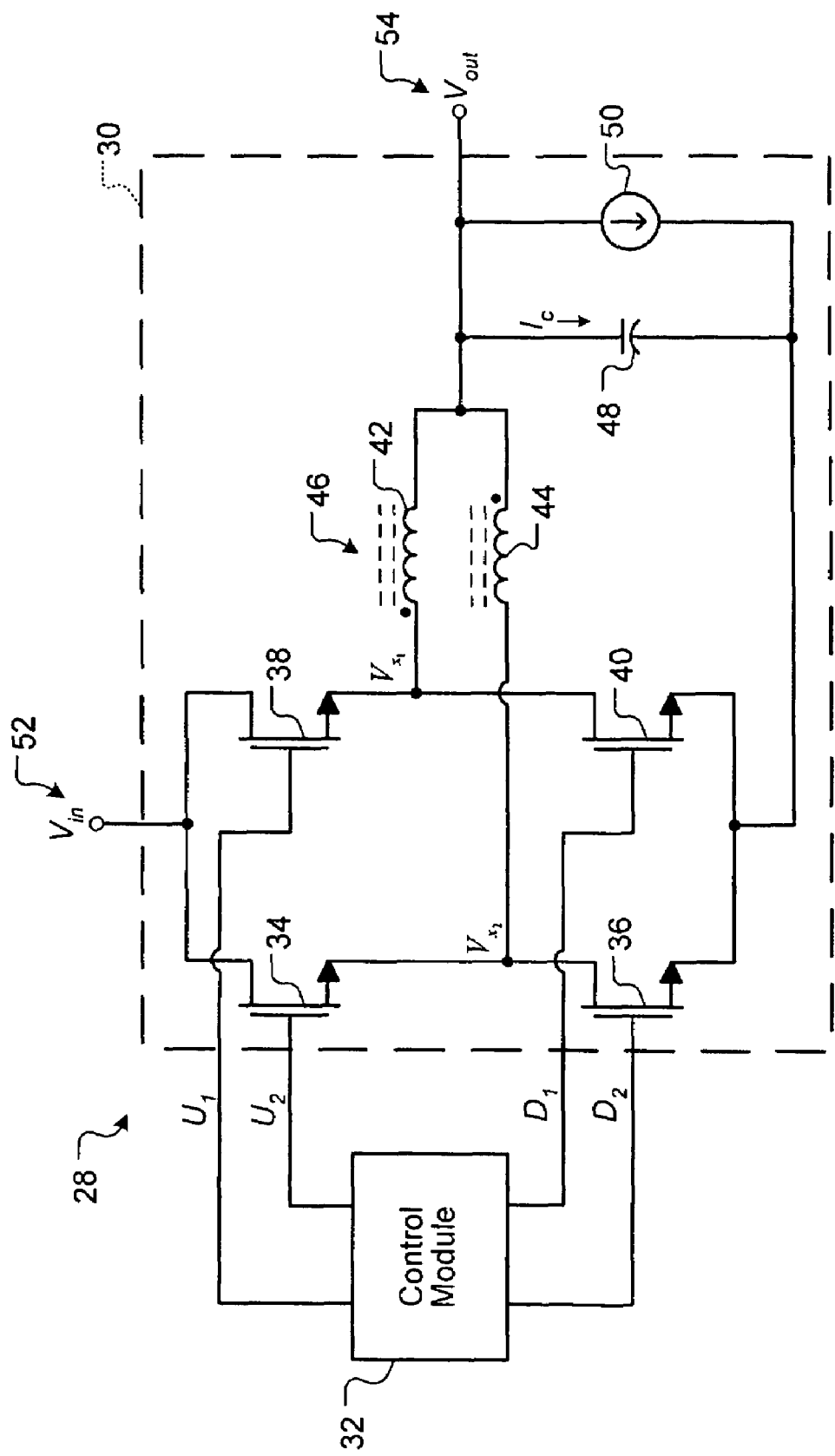
FIG. 2 is a functional block diagram and electrical schematic of a coupled-inductor DC/DC converter with a control module that implements an open-loop control system according to the present invention.

Referring now to FIG. 2, an open-loop control system 28 for a DC/DC converter 30 includes a control module 32. The DC/DC converter 30 includes first, second, third, and fourth transistors 34, 36, 38, and 40, respectively. Sources (or second terminals) of the first and third transistors 34 and 38, respectively, communicate with drains (or first terminals) of the second and fourth transistors 36 and 40, respectively. Drains of the first and third transistors 34 and 38, respectively, communicate and sources of the second and fourth transistors 36 and 40, respectively, communicate.

First and second inductors 42 and 44, respectively, form a coupled inductor circuit 46. A first end of the first inductor 46 communicates with the source of the third transistor 38 and the drain of the fourth transistor 40. A first end of the second inductor 44 communicates with the source of the first transistor 34 and the drain of the second transistor 36. Second ends of the first and second inductors 42 and 44, respectively, communicate. A first end of a capacitor 48 communicates with the second ends of the first and second inductors 42 and 44, respectively.

A second end of the capacitor 48 communicates with the sources of the second and fourth transistors 36 and 40, respectively. A first end of a current source 50 communicates with the first end of the capacitor 48 and the second ends of the first and second inductors 42 and 44, respectively. A second end of the current source 50 communicates with the sources of the second and fourth transistors 36 and 40, respectively, and the second end of the capacitor 48. A input DC voltage 52 ($V_{in}$) of the DC/DC converter 30 communicates with the drains of the first and third transistors 34 and 38, respectively. An output DC voltage 54 ($V_{out}$) of the DC/DC converter 30 in referenced from the second ends of the first and second inductors 42 and 44, respectively, the first end of the capacitor 48, and the first end of the current source 50.

The control module 32 generates first, second, third, and fourth control signals $U_2$, $D_2$, $U_1$, and $D_1$ that communicate with gates (or control terminals) of the first, second, third, and fourth transistors 34, 36, 38, and 40, respectively. The control module 32 charges the first inductor 42 by setting the third and fourth control signals $U_1$ and $D_1$, respectively, high (or low) and discharges the first inductor 42 by setting the third and fourth control signals $U_1$ and $D_1$, respectively, low (or high).

The control module 32 charges the second inductor 44 by setting the first and second control signals $U_2$ and $D_2$, respectively, high (or low) and discharges the second inductor 44 by setting the first and second control signals $U_2$ and $D_2$, respectively, low (or high). Based on a frequency and duty cycle of the control signals, the DC/DC converter 30 transforms the input DC voltage 52 into the output DC voltage 54, which is at a different level than the input DC voltage 52.

Figure 3:
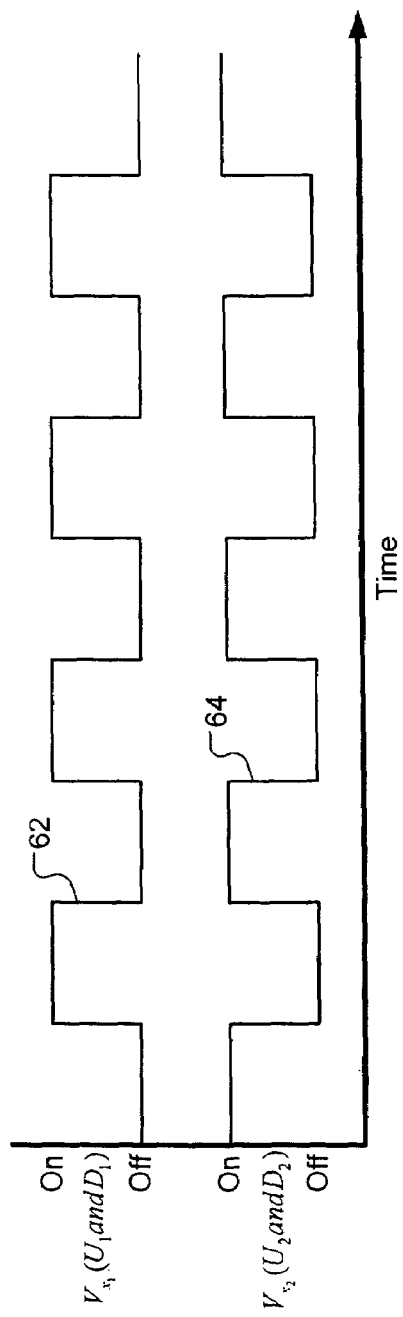
FIG. 3 is a timing diagram that illustrates the control signal waveforms generated by the control module of FIG. 2 including alternating charging and discharging of the first and second inductors.

Referring now to FIG. 3, signal waveforms of the third and fourth control signals $U_1$ and $D_1$, respectively, indicated by 62, and of the first and second control signals $U_2$ and $D_2$, respectively, indicated by 64, are shown as square waveforms. The control module 32 maintains the signal waveforms for the first, second, third, and fourth control signals $U_2$, $D_2$, $U_1$, and $D_1$, respectively, at a predetermined frequency and duty cycle so that the DC/DC converter 30 generates a desired voltage. Signal waveforms 62 of the third and fourth control signals $U_1$ and $D_1$, respectively, are complementary (or 180 degrees out-of-phase) to the signal waveforms 64 of the first and second control signals $U_2$ and $D_2$, respectively. Therefore, when the first inductor 42 charges, the second inductor 44 discharges. Likewise, when the first inductor 42 discharges, the second inductor 44 charges.

An advantage of the open-loop control system 28 of FIG. 2 is that the DC/DC converter 30 has a high efficiency and generates a small voltage ripple. The DC/DC converter 30 also has a relatively fast response, which allows the capacitor 48 to be smaller in size. Additionally, the control module 32 maintains the signal waveforms of the first, second, third, and fourth control signals $U_2$, $D_2$, $U_1$, and $D_1$, respectively, at a fixed frequency and duty cycle. Therefore, no additional control is required for the open-loop control system 28 during normal operations.

However, there are advantages to allowing the phases of the signal waveforms for the third and fourth control signals $U_1$ and $D_1$, respectively, and the first and second control signals $U_2$ and $D_2$, respectively, to overlap for a controlled period of time. For example, allowing same-phase operation of the control signals for a controlled period of time reduces the size of the effective inductor and produces a much faster response in the DC/DC converter 30. This allows the capacitor 48 to be even smaller in size. However, if same-phase operation of the control signals continues for too long, too much current may be charged in the first and second inductors 42 and 44, respectively, which adversely affects performance of the DC/DC converter 30. Therefore, it is necessary to determine under which conditions same-phase operation of the control signals is initiated and for how long.

Figure 4:
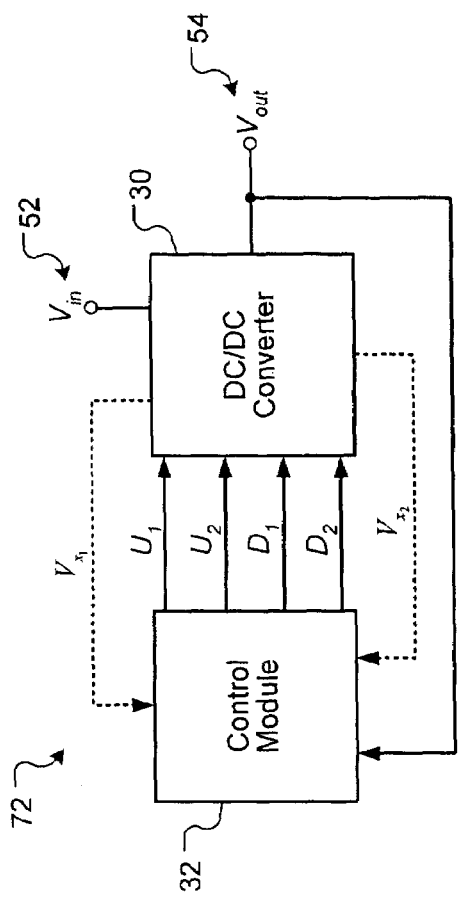
FIG. 4 is a functional block diagram of a closed-loop control system for a DC/DC converter.

Referring now to FIG. 4, a closed-loop control system 72 for the DC/DC converter 30 according to the present invention is shown. An input of the control module 32 receives the output DC voltage 54 of the DC/DC converter 30. The control module 32 also optionally receives voltage signals $V_{x_1}$ and $V_{x_2}$ from the first and second inductors 42 and 44, respectively. For example, the control module 32 may perform a current estimation based on voltage signals $V_{x_1}$ and $V_{x_2}$ to sense a balance of the first and second inductors 42 and 44, respectively.

The control module 32 ensures that the phases of the signal waveforms for the third and fourth control signals $U_1$ and $D_1$, respectively, are complementary to the phases of the signal waveforms for the first and second control signals $U_2$ and $D_2$, respectively, during normal operations. The control module 32 initiates same-phase operation of the control signals when a large voltage or current transient is detected in the DC/DC converter 30 based on the output DC voltage 54.

In an exemplary embodiment, the control module 32 initiates same-phase operation of the control signals when a value of the output DC voltage 54 is outside of a predetermined range. For example, the control module 32 sets the signal waveforms of the control signals low (or high) when the value of the output DC voltage 54 is greater than a first predetermined voltage. This allows both the first and second inductors 42 and 44, respectively, to discharge. The control module 32 sets the signal waveforms of the control signals high (or low) when the value of the output DC voltage 54 is less than a second predetermined voltage. This allows both the first and second inductors 42 and 44, respectively, to charge.

The control module 32 may revert back to complementary operation of the control signals when the value of the output DC voltage 54 is back within the predetermined range. Alternatively, the control module 32 may revert back to complementary operation of the control signals after a predetermined time period. In an exemplary embodiment, the predetermined time period is a function of one or more circuit conditions such as a current or voltage magnitude within the DC/DC converter 30.

In the event that the output DC voltage 54 is within the predetermined range, the current, $I_c$, flowing through the capacitor 48 may still be too high or too low. Therefore, in another exemplary embodiment, the control module 32 initiates same-phase operation of the control signals when a value of the current flowing through the capacitor 48 is outside of a predetermined range. For example, the control module 32 sets the signal waveforms of the control signals low (or high) when the current flowing through the capacitor 48 is greater than a first predetermined current. This allows both the first and second inductors 42 and 44, respectively, to discharge.

The control module 32 sets the signal waveforms of the control signals high (or low) when the current flowing through the capacitor 48 is less than a second predetermined current. This allows both the first and second inductors 42 and 44, respectively, to charge. As in the case of the voltage threshold, the control module 32 may revert back to complementary operation of the control signals when the current flowing through the capacitor 48 is back within the predetermined range. Alternatively, the control module 32 may revert back to complementary operation of the control signals after a predetermined time period.

Figure 5:
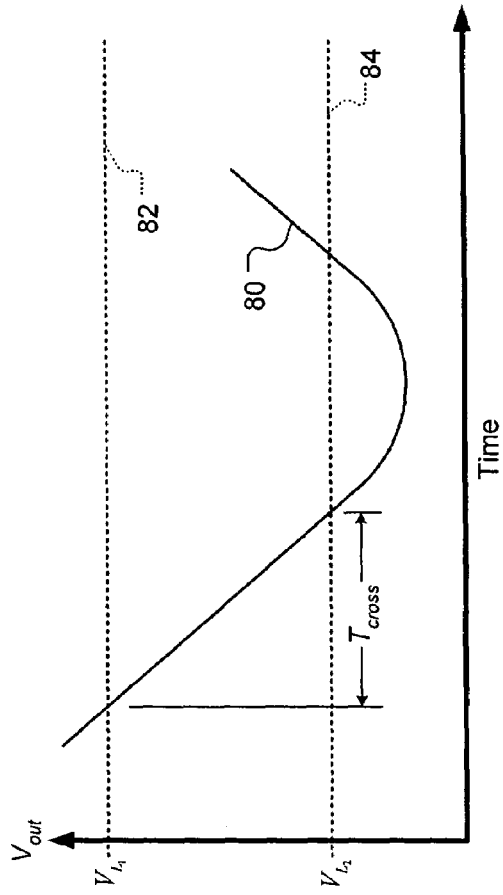
FIG. 5 is a graph showing the output voltage of the DC/DC converter in FIG. 4 as a function of time.

Referring now to FIG. 5, the control module 32 estimates the current, $I_c$, flowing through the capacitor 48 based on the output DC voltage 54, $V_{out}$. The current flowing through the capacitor 48 is proportional to the rate of change of the output DC voltage 54. Therefore, the control module 32 computes the amount of time, $T_{cross}$, that it takes for the output DC voltage 54, indicated by 80, to increase or decrease from a first predetermined voltage ($V_{L_2}$ or $V_{L_1}$) to a second predetermined voltage ($V_{L_1}$ or $V_{L_2}$) In the exemplary embodiment illustrated in FIG. 5, the output DC voltage 54 decreases from a first predetermined voltage ($V_{L_1}$), indicated by 82, to a second predetermined voltage ($V_{L_2}$), indicated by 84.

As the value of $T_{cross}$ decreases, the slope of $V_{out}$ increases, which corresponds to an increase in the current flowing through the capacitor 48. Likewise, as the value of $T_{cross}$ increases, the slope of $V_{out}$ decreases, which corresponds to a decrease in the current flowing through the capacitor 48. Therefore, by comparing $T_{cross}$ to a predetermined time period, the control module 32 determines when the current flowing through the capacitor 48 is outside of the predetermined range. Alternatively, the control module 32 may estimate the current flowing through the capacitor 48 based on an average value of $V_{out}$ during a predetermined time period.

Figure 6:
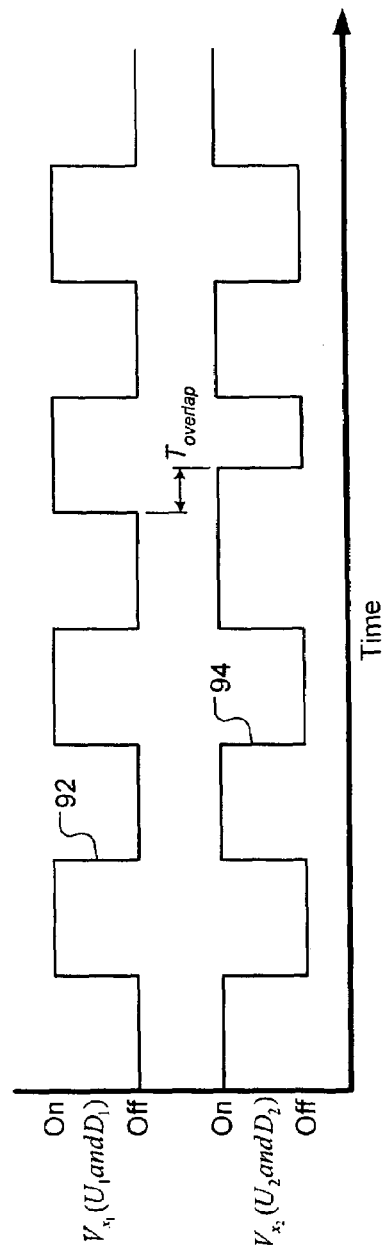
FIG. 6 is a timing diagram that illustrates the control signal waveforms generated by the control module of FIG. 4 including an overlap of the charging pattern for the first and second inductors.

Referring now to FIG. 6, the phase of the signal waveforms for the third and fourth control signals $U_1$ and $D_1$, respectively, indicated at 92, overlaps the phase of the signal waveforms for the first and second control signals $U_2$ and $D_2$, respectively, indicated at 94, for a controlled period of time, $T_{overlap}$. The $T_{overlap}$ period identifies when the control module 32 maintains same-phase operation of the control signals. Before and after the $T_{overlap}$ period, the control module 32 maintains complementary operation of the control signals.

Figure 7:
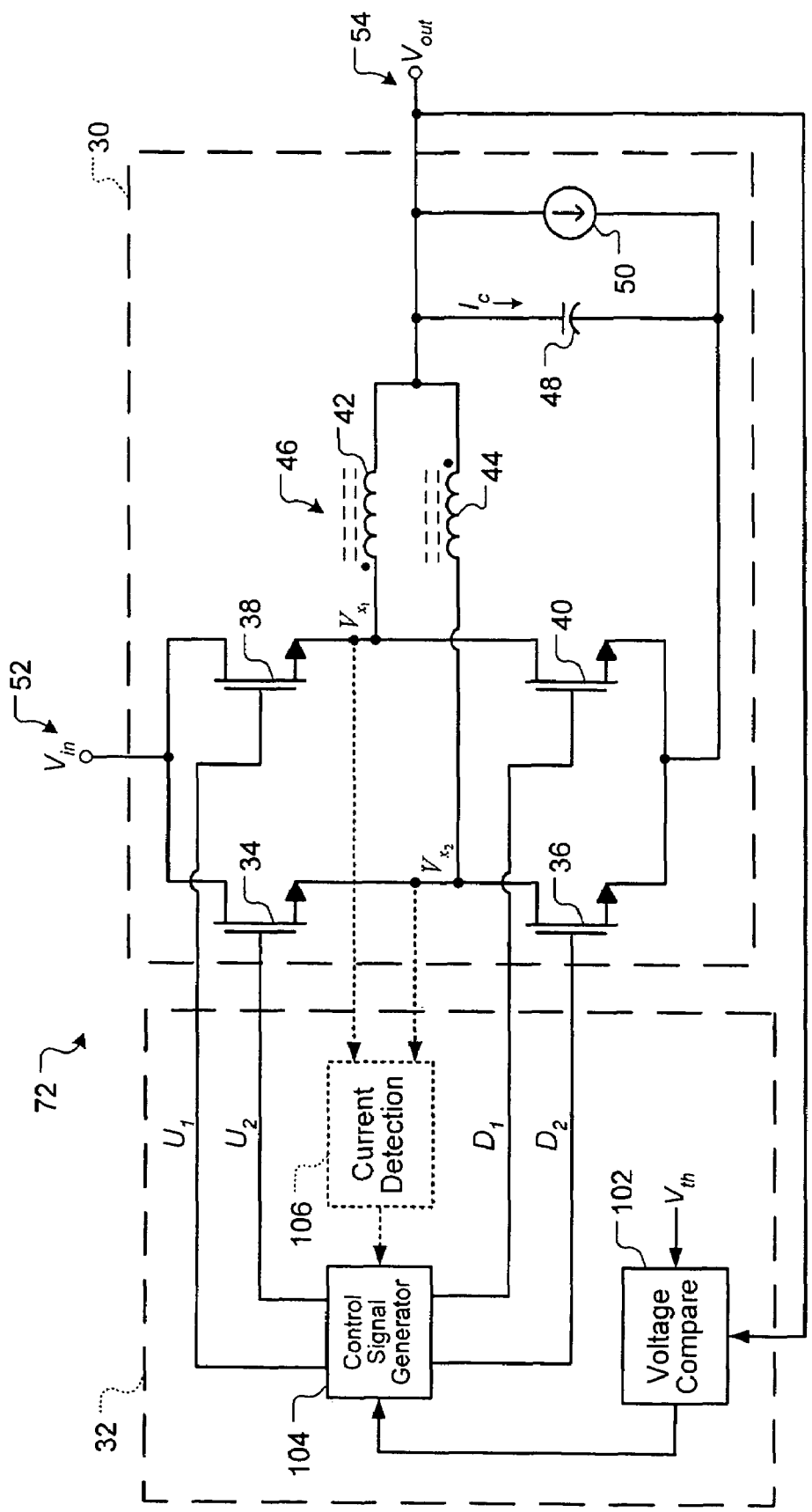
FIG. 7 is an electrical schematic of the closed-loop DC/DC control system of FIG. 4.

Referring now to FIG. 7, the control module 32 and the DC/DC converter 30 are illustrated in further detail. Similar reference numbers are used to identify elements as in FIG. 2. The control module 32 includes a voltage compare module 102 and a control signal generator 104. The control module 32 also optionally includes a current detection module 106. A first input of the voltage compare module 102 receives the output DC voltage 54 from the DC/DC converter 30. A second input of the voltage compare module 102 receives a predetermined voltage. The voltage compare module 102 compares the output DC voltage 54 and the predetermined voltage to determine when the output DC voltage 54 is greater than or less than the predetermined voltage.

The voltage compare module 102 outputs the result to the control signal generator 104. Inputs of the optional current detection module 106 receive the voltage signals $V_{x_1}$ and $V_{x_2}$ from the first and second inductors 42 and 44, respectively. The current detection module 106 computes the difference between $V_{x_1}$ and $V_{x_2}$ and transmits the difference to the control signal generator 104. The control signal generator 104 generates the first, second, third, and fourth control signals $U_2$, $D_2$, $U_1$ and $D_1$, respectively, based on values of the control signals from the voltage compare module 102 and/or the current detection module 106. The control signal generator 104 transmits the first, second, third, and fourth control signals $U_2$, $D_2$, $U_1$ and $D_1$, respectively, to the gates of the first, second, third, and fourth transistors 34, 36, 38, and 40, respectively, in the DC/DC converter 30.

Figure 8:
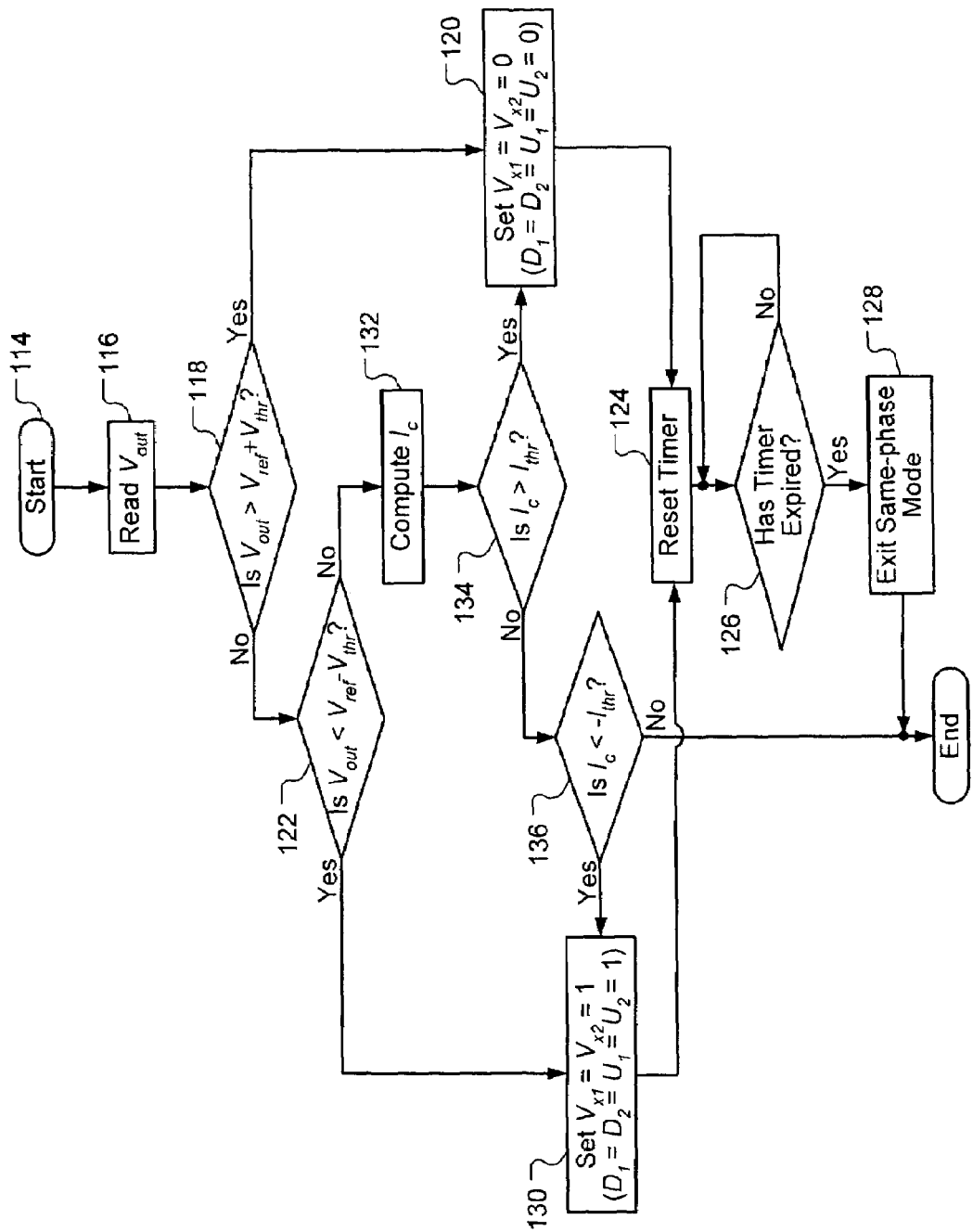
FIG. 8 is a flowchart illustrating steps performed by the control module of FIGS. 4 and 7 including initiating same-phase operation of the first and second inductors for a predetermined time period.

Referring now to FIG. 8, a first closed-loop control algorithm begins in step 114. In step 116, control reads the value of the output DC voltage 54 from the DC/DC converter 30. In step 118, control determines whether the output DC voltage 54 is greater than a first predetermined voltage plus a threshold. If true, control proceeds to step 120. If false, control proceeds to step 122. In step 120, control initiates same-phase operation of the control signals by setting the signal waveforms of the control signals low (or high). In step 124, control resets a timer. In step 126, control determines whether the timer has expired. If false, control loops to step 126. If true, control proceeds to step 128.

In step 128, the control module 32 reverts back to complementary operation of the control signals and control ends. In step 122, control determines whether the output DC voltage 54 is less than a second predetermined voltage minus a threshold. For example, the thresholds in steps 118 and 122 may be equal and/or the first and second predetermined voltages may be equal. If true, control proceeds to step 130. If false, control proceeds to step 132. In step 130, the control module 32 initiates same-phase operation of the control signals by setting the signal waveforms of the control signals high (or low) and control proceeds to step 124.

In step 132, the control module 32 estimates the current flowing through the capacitor 48 in the DC/DC converter 30. In step 134, control determines whether the current flowing through the capacitor 48 is greater than a first predetermined current. If true, control proceeds to step 120. If false, control proceeds to step 136. In step 136, control determines whether the current flowing through the capacitor 48 is less than a second predetermined current. For example, the second predetermined current may be equal in magnitude to the first predetermined current and have an opposite polarity. If true, control proceeds to step 130. If false, control ends.

Figure 9:
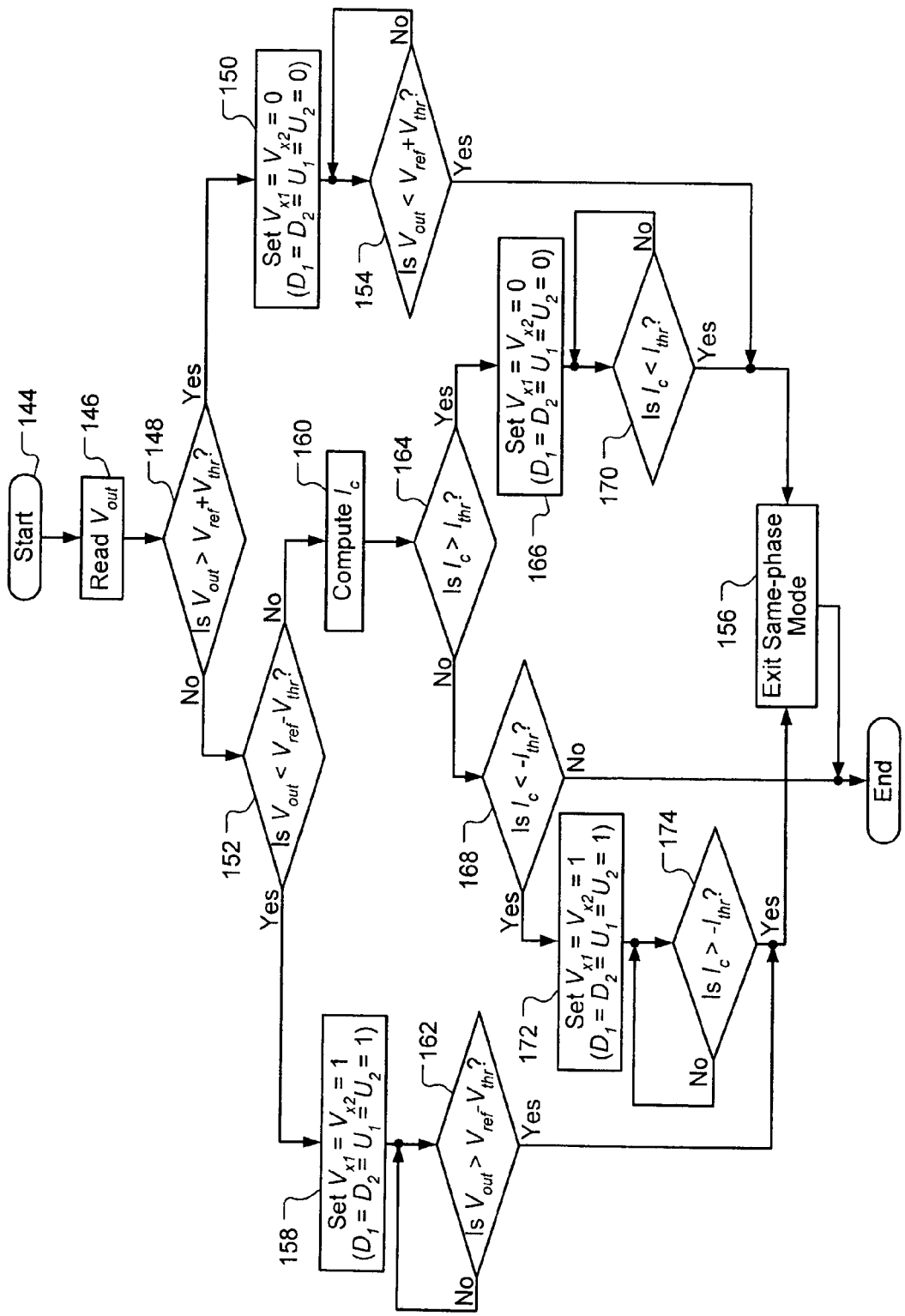
FIG. 9 is a flowchart illustrating steps performed by the control module of FIGS. 4 and 7 including initiating same-phase operation of the first and second inductors while a variable is outside of a predetermined range.

Referring now to FIG. 9, a second closed-loop control algorithm begins in step 144. In step 146, control reads the value of the output DC voltage 54 from the DC/DC converter 30. In step 148, control determines whether the output DC voltage 54 is greater than a first predetermined voltage plus a threshold. If true, control proceeds to step 150. If false, control proceeds to step 152. In step 150, the control module 32 initiates same-phase operation of the control signals by setting the signal waveforms of the control signals low (or high). In step 154, control determines whether the output DC voltage 54 is less than the first predetermined voltage plus the threshold. Is false, control loops to step 154. If true, control proceeds to step 156. In step 156, the control module 32 reverts back to complementary operation of the control signals and control ends.

In step 152, control determines whether the output DC voltage 54 is less than a second predetermined voltage minus a threshold. For example, the thresholds in steps 148 and 152 may be equal and/or the first and second predetermined voltages may be equal. If true, control proceeds to step 158. If false, control proceeds to step 160. In step 158, the control module 32 initiates same-phase operation of the control signals by setting the signal waveforms of the control signals high (or low). In step 162, control determines whether the output DC voltage 54 is greater than the second predetermined voltage minus the threshold. If false, control loops to step 162. If true, control proceeds to step 156. In step 160, the control module 32 estimates the current flowing through the capacitor 48 in the DC/DC converter 30.

In step 164, control determines whether the current flowing through the capacitor 48 is greater than a first predetermined current. If true, control proceeds to step 166. If false, control proceeds to step 168. In step 166, the control module 32 initiates same-phase operation of the control signals by setting the signal waveforms of the control signals low (or high). In step 170, control determines whether the current flowing through the capacitor 48 is less than the first predetermined current. If false, control loops to step 170. If true, control proceeds to step 156.

In step 168, control determines whether the current flowing through the capacitor 48 is less than a second predetermined current. For example, the second predetermined current may be equal in magnitude to the first predetermined current and have an opposite polarity. If false, control ends. If true, control proceeds to step 172. In step 172, the control module 32 initiates same-phase operation of the control signals by setting the signal waveforms of the control signals high (or low). In step 174, control determines whether the current flowing through the capacitor 48 is greater than the second predetermined current. If false, control loops to step 174. If true, control proceeds to step 156.

The present invention allows for closed-loop digital control of a coupled-inductor DC/DC converter 30. However, the methods of the present invention may also be employed to control other electronic circuits of a similar nature. By utilizing an output voltage feedback path, the control module 32 is capable of detecting large voltage or current transients in the circuitry of the DC/DC converter 30. Therefore, the previous constraint of constant complementary operation of the control signals is relaxed. This allows the DC/DC converter 30 to achieve an even faster response and requires an even smaller output capacitor 48 than DC/DC converters that employ open-loop control systems.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A closed-loop control system for a DC/DC converter, comprising:
    a DC/DC converter that receives a first DC voltage and that generates a second DC voltage, wherein said DC/DC converter includes first and second inductances; and
    a control module that communicates with said DC/DC converter, that receives said second DC voltage, and that generates at least one control signal to one of charge or discharge said first and second inductances, wherein said control module has first and second modes, wherein during said first mode said control module alternately charges one of said first and second inductances and discharges the other of said first and second inductances, and wherein during said second mode said control module one of charges or discharges both of said first and second inductances.

2. The closed-loop control system of claim 1 wherein said control module initiates said second mode when a transient condition occurs in said DC/DC converter.

3. The closed-loop control system of claim 2 wherein said control module detects said transient condition when said second DC voltage is one of greater than a first predetermined voltage or less than a second predetermined voltage.

4. The closed-loop control system of claim 3 wherein, during said second mode, said control module initiates said first mode when said second DC voltage is both less than said first predetermined voltage and greater than said second predetermined voltage.

5. The closed-loop control system of claim 3 wherein said control module discharges both of said first and second inductances when said second voltage is greater than said first predetermined voltage.

6. The closed-loop control system of claim 3 wherein said control module charges both of said first and second inductances when said second DC voltage is less than said second predetermined voltage.

7. The closed-loop control system of claim 2 wherein said DC/DC converter includes an output capacitance and wherein said control module detects said transient condition when current through said output capacitance is one of greater than a first predetermined current or less than a second predetermined current.

8. The closed-loop control system of claim 7 wherein, during said second mode, said control module initiates said first mode when said current is less than said first predetermined current and greater than said second predetermined current.

9. The closed-loop control system of claim 7 wherein said control module charges both of said first and second inductances when said current is less than said second predetermined current.

10. The closed-loop control system of claim 7 wherein said control module discharges both of said first and second inductances when said current is greater than said first predetermined current.

11. The closed-loop control system of claim 7 wherein said control module determines said current based on a rate of change of said second DC voltage.

12. The closed-loop control system of claim 11 wherein said current is one of greater than said first predetermined current or less than said second predetermined current when said rate of change is greater than a predetermined rate of change.

13. The closed-loop control system of claim 7 wherein said control module determines said current based on an average value of said second DC voltage during a predetermined time period.

14. The closed-loop control system of claim 1 wherein, during said second mode, said control module initiates said first mode after a predetermined time period.

15. The closed-loop control system of claim 1 wherein said DC/DC converter includes an output capacitance and wherein said output capacitance discharges when said control module discharges both of said first and second inductances.

16. The closed-loop control system of claim 1 wherein said DC/DC converter includes an output capacitance and wherein said output capacitance charges when said control module charges both of said first and second inductances.

17. The closed-loop control system of claim 1 wherein said DC/DC converter includes:
    first, second, third, and fourth switches,
    wherein second terminals of said first and third switches communicate with first terminals of said second and fourth switches, respectively, first terminals of said first and third switches communicate, second terminals of said second and fourth switches communicate, a first end of said first inductance communicates with said second terminal of said third switch and said first terminal of said fourth switch, a first end of said second inductance communicates with said second terminal of said first switch and said first terminal of said second switch, and second ends of said first and second inductances communicate; and
    a capacitance having a first end that communicates with said second ends of said first and second inductances and a second end that communicates with said second terminals of said second and fourth switches.

18. The closed-loop control system of claim 17 wherein said first, second, third, and fourth switches comprise transistors.

19. The closed-loop control system of claim 17 wherein said control module generates first, second, third, and fourth control signals that communicate with control terminals of said first, second, third, and fourth switches, respectively.

20. The closed-loop control system of claim 19 wherein said control module asserts said third and fourth control signals to charge said first inductance and said first and second control signals to charge said second inductance.

21. The closed-loop control system of claim 17 wherein said first DC voltage is input to said first terminals of said first and third switches.

22. The closed-loop control system of claim 17 wherein said second DC voltage is referenced from said first end of said capacitance.

23. The closed-loop control system of claim 17 wherein said DC/DC converter includes a current source and wherein a first end of said current source communicates with said second end of said first and second inductances and said first end of said capacitance and a second end of said current source communicates with said second terminals of said second and fourth switches and said second end of said capacitance.

24. A closed-loop control system for a DC/DC converter, comprising:
  converting means for receiving a first DC voltage and generating a second DC voltage, wherein said converting means includes first and second inductances; and
  controlling means that communicate with said converting means for receiving said second DC voltage and generating at least one control signal to one of charge or discharge said first and second inductances,
  wherein said controlling means has first and second modes, wherein during said first mode said controlling means alternately charges one of said first and second inductances and discharges the other of said first and second inductances, and wherein during said second mode said controlling means one of charges or discharges both of said first and second inductances.

25. The closed-loop control system of claim 24 wherein said controlling means initiates said second mode when a transient condition occurs in said converting means.

26. The closed-loop control system of claim 25 wherein said controlling means detects said transient condition when said second DC voltage is one of greater than a first predetermined voltage or less than a second predetermined voltage.

27. The closed-loop control system of claim 26 wherein, during said second mode, said controlling means initiates said first mode when said second DC voltage is both less than said first predetermined voltage and greater than said second predetermined voltage.

28. The closed-loop control system of claim 26 wherein said controlling means discharges both of said first and second inductances when said second voltage is greater than said first predetermined voltage.

29. The closed-loop control system of claim 26 wherein said controlling means charges both of said first and second inductances when said second DC voltage is less than said second predetermined voltage.

30. The closed-loop control system of claim 25 wherein said converting means includes an output capacitance and wherein said controlling means detects said transient condition when current through said output capacitance is one of greater than a first predetermined current or less than a second predetermined current.

31. The closed-loop control system of claim 30 wherein, during said second mode, said controlling means initiates said first mode when said current is less than said first predetermined current and greater than said second predetermined current.

32. The closed-loop control system of claim 30 wherein said controlling means charges both of said first and second inductances when said current is less than said second predetermined current.

33. The closed-loop control system of claim 30 wherein said controlling means discharges both of said first and second inductances when said current is greater than said first predetermined current.

34. The closed-loop control system of claim 30 wherein said controlling means determines said current based on a rate of change of said second DC voltage.

35. The closed-loop control system of claim 34 wherein said current is one of greater than said first predetermined current or less than said second predetermined current when said rate of change is greater than a predetermined rate of change.

36. The closed-loop control system of claim 30 wherein said controlling means determines said current based on an average value of said second DC voltage during a predetermined time period.

37. The closed-loop control system of claim 24 wherein, during said second mode, said controlling means initiates said first mode after a predetermined time period.

38. The closed-loop control system of claim 24 wherein said converting means includes an output capacitance and wherein said output capacitance discharges when said controlling means discharges both of said first and second inductances.

39. The closed-loop control system of claim 24 wherein said converting means includes an output capacitance and wherein said output capacitance charges when said controlling means charges both of said first and second inductances.

40. The closed-loop control system of claim 24 wherein said converting means includes:
  first, second, third, and fourth switches,
    wherein second terminals of said first and third switches communicate with first terminals of said second and fourth switches, respectively, first terminals of said first and third switches communicate, second terminals of said second and fourth switches communicate, a first end of said first inductance communicates with said second terminal of said third switch and said first terminal of said fourth switch, a first end of said second inductance communicates with said second terminal of said first switch and said first terminal of said second switch, and second ends of said first and second inductances communicate; and
  a capacitance having a first end that communicates with said second ends of said first and second inductances and a second end that communicates with said second terminals of said second and fourth switches.

41. The closed-loop control system of claim 40 wherein said first, second, third, and fourth switches comprise transistors.

42. The closed-loop control system of claim 40 wherein said controlling means generates first, second, third, and fourth control signals that communicate with control terminals of said first, second, third, and fourth switches, respectively.

43. The closed-loop control system of claim 42 wherein said controlling means asserts said third and fourth control signals to charge said first inductance and said first and second control signals to charge said second inductance.

44. The closed-loop control system of claim 40 wherein said first DC voltage is input to said first terminals of said first and third switches.

45. The closed-loop control system of claim 40 wherein said second DC voltage is referenced from said first end of said capacitance.

46. The closed-loop control system of claim 40 wherein said converting means includes a current source and wherein a first end of said current source communicates with said second end of said first and second inductances and said first end of said capacitance and a second end of said current source communicates with said second terminals of said second and fourth switches and said second end of said capacitance.

47. A method for operating a closed-loop control system for a DC/DC converter, comprising:
   providing a DC/DC converter that receives a first DC voltage and that generates a second DC voltage, wherein said DC/DC converter includes first and second inductances;
   generating at least one control signal to one of charge or discharge said first and second inductances based on said second DC voltage;
   operating said DC/DC converter in first and second modes;
   alternately charging one of said first and second inductances and discharging the other of said first and second inductances during said first mode; and
   one of charging or discharging both of said first and second inductances during said second mode.

48. The method of claim 47 further comprising initiating said second mode when a transient condition occurs in said DC/DC converter.

49. The method of claim 48 further comprising detecting said transient condition when said second DC voltage is one of greater than a first predetermined voltage or less than a second predetermined voltage.

50. The method of claim 49 further comprising, during said second mode, initiating said first mode when said second DC voltage is both less than said first predetermined voltage and greater than said second predetermined voltage.

51. The method of claim 49 further comprising discharging both of said first and second inductances when said second voltage is greater than said first predetermined voltage.

52. The method of claim 49 further comprising charging both of said first and second inductances when said second DC voltage is less than said second predetermined voltage.

53. The method of claim 2 further comprising detecting said transient condition when current through an output capacitance in said DC/DC converter is one of greater than a first predetermined current or less than a second predetermined current.

54. The method of claim 53 further comprising during said second mode, initiating said first mode when said current is less than said first predetermined current and greater than said second predetermined current.

55. The method of claim 53 further comprising charging both of said first and second inductances when said current is less than said second predetermined current.

56. The method of claim 53 further comprising discharging both of said first and second inductances when said current is greater than said first predetermined current.

57. The method of claim 53 further comprising determining said current based on a rate of change of said second DC voltage.

58. The method of claim 57 wherein said current is one of greater than said first predetermined current or less than said second predetermined current when said rate of change is greater than a predetermined rate of change.

59. The method of claim 53 further comprising determining said current based on an average value of said second DC voltage during a predetermined time period.

60. The method of claim 47 further comprising, during said second mode, initiating said first mode after a predetermined time period.

61. The method of claim 47 further comprising discharging both of said first and second inductances, wherein an output capacitance in said DC/DC converter discharges during said discharging step.

62. The method of claim 47 further comprising charging both of said first and second inductances, wherein an output capacitance in said DC/DC converter charges during said charging step.

63. The method of claim 47 wherein said DC/DC converter includes:
   first, second, third, and fourth switches,
   wherein second terminals of said first and third switches communicate with first terminals of said second and fourth switches, respectively, first terminals of said first and third switches communicate, second terminals of said second and fourth switches communicate, a first end of said first inductance communicates with said second terminal of said third switch and said first terminal of said fourth switch, a first end of said second inductance communicates with said second terminal of said first switch and said first terminal of said second switch, and second ends of said first and second inductances communicate; and
   a capacitance having a first end that communicates with said second ends of said first and second inductances and a second end that communicates with said second terminals of said second and fourth switches.

64. The method of claim 63 wherein said first, second, third, and fourth switches comprise transistors.

65. The method of claim 63 further comprising generating first, second, third, and fourth control signals that communicate with control terminals of said first, second, third, and fourth switches, respectively.

66. The method of claim 65 further comprising asserting said third and fourth control signals to charge said first inductance; and
   asserting said first and second control signals to charge said second inductance.

67. The method of claim 63 further comprising inputting said first DC voltage to said first terminals of said first and third switches.

68. The method of claim 63 further comprising referencing said second DC voltage from said first end of said capacitance.

69. The method of claim 63 wherein said DC/DC converter includes a current source and wherein a first end of said current source communicates with said second end of said first and second inductances and said first end of said capacitance and a second end of said current source communicates with said second terminals of said second and fourth switches and said second end of said capacitance.

* * * * *

UNITED STATES PATENT AND TRADEMARK OFFICE
CERTIFICATE OF CORRECTION

PATENT NO.        : 7,190,152 B2                                              Page 1 of 1
APPLICATION NO. : 10/890491
DATED             : March 13, 2007
INVENTOR(S)       : Runsheng He It is certified that error appears in the above-identified patent and that said Letters Patent is hereby corrected as shown below:

Column 4, Line 61:     Delete "in" and insert --is--
Column 8, Line 31:     Delete "Is" and insert --If--
Column 13, Line 41:    Delete "2" and insert --52--

Signed and Sealed this

Third Day of July, 2007

JON W. DUDAS
*Director of the United States Patent and Trademark Office*